US008314709B2

(12) United States Patent
Lance et al.

(10) Patent No.: US 8,314,709 B2
(45) Date of Patent: Nov. 20, 2012

(54) FIRE DETECTION FAULT ENHANCEMENT

(75) Inventors: Peter Lance, Mississauga (CA); Gordon Ferch, Etobicoke (CA)

(73) Assignee: Pratt & Whitney Canada Corp., Longueuil (CA)

( * ) Notice: Subject to any disclaimer, the term of this patent is extended or adjusted under 35 U.S.C. 154(b) by 495 days.

(21) Appl. No.: 12/573,704

(22) Filed: Oct. 5, 2009

(65) Prior Publication Data

US 2011/0080296 A1 Apr. 7, 2011

(51) Int. Cl.

| | |
|---|---|
| ***G08B 17/12*** | (2006.01) |
| ***G01F 1/68*** | (2006.01) |
| ***H05B 1/02*** | (2006.01) |

(52) U.S. Cl. .................... 340/578; 340/579; 73/204.15; 219/483

(58) Field of Classification Search .................. 340/577, 340/581, 584, 587, 588, 589, 578, 579; 338/22 R, 338/25, 28, 195; 374/116; 219/483, 486, 219/497; 73/115, 204.15, 204.26
See application file for complete search history.

(56) References Cited

U.S. PATENT DOCUMENTS

| | | | | |
|---|---|---|---|---|
| 3,603,953 | A * | 9/1971 | Lindberg et al. | 374/116 |
| 4,424,479 | A | 1/1984 | Brown | |
| 5,045,840 | A | 9/1991 | Barrier et al. | |
| 5,142,235 | A | 8/1992 | Matsumoto et al. | |
| 5,250,909 | A | 10/1993 | Bitts | |
| 5,317,520 | A | 5/1994 | Castle | |
| 5,448,224 | A * | 9/1995 | Mochizuki | 340/589 |
| 5,583,441 | A | 12/1996 | Bitts | |
| 5,600,296 | A * | 2/1997 | Kuzuoka et al. | 338/22 R |
| 5,781,098 | A * | 7/1998 | Shibata | 338/28 |
| 6,292,541 | B1 | 9/2001 | Tice et al. | |
| 6,343,498 | B1 | 2/2002 | Oba et al. | |
| 6,794,880 | B2 | 9/2004 | Tucker | |
| 7,340,337 | B2 | 3/2008 | Katrak | |

* cited by examiner

*Primary Examiner* — Van T. Trieu
(74) *Attorney, Agent, or Firm* — Norton Rose Canada LLP

(57) ABSTRACT

A fire detection switch for use in a fire detection circuit of a aircraft engine, having: a first resistor and a second resistor disposed in series between a common terminal and an alarm terminal; and a thermally-sensitive element having a different resistance at low temperature than at high temperature, the thermally-sensitive element disposed in series with the second resistor and in parallel with the first resistor.

9 Claims, 3 Drawing Sheets

Fig. 4

| PHYSICAL CONDITION | STATE OF THE FIRE DETECTION SWITCH CIRCUIT | RESISTANCE DETECTED BETWEEN TERMINALS 12 AND 13 |
|---|---|---|
| **PRIOR ART DEVICE (FIG. 2)** | | |
| Normal | Open Fire Switch 14 | R1 |
| Fire | Current flowing through Closed Fire Switch 14 | Minimal Resistance |
| Short Circuit | Current shorted between terminals 12 & 13, and bypassing both R1 and Fire Switch 14 | Minimal Resistance |
| **CLAIMED DEVICE (FIG.3, Normally Open Fire Switch 14)** | | |
| Normal | Open Fire Switch 14 | R2 + R3 |
| Fire | Current flowing through Closed Fire Switch 14 and resistor R2 | R2 only, (R3 Bypassed) |
| Short Circuit | Current shorted between terminals 12 & 13, and bypassing R2, R3 and Fire Switch 14 | Minimal Resistance |
| **CLAIMED DEVICE (Normally Closed Fire Switch 14)** | | |
| Normal | Closed Fire Switch 14 | R2 only, (R3 Bypassed) |
| Fire | Current flowing through resistors R3 and R2, Fire Switch 14 Open | R2 + R3 |
| Short Circuit | Current shorted between terminals 12 & 13, and bypassing R2, R3 and Fire Switch 14 | Minimal Resistance |

FIRE DETECTION FAULT ENHANCEMENT

TECHNICAL FIELD

The application relates to an improved fire detection switch that provides an improved ability to distinguish between a fire condition and a false alarm caused by, for example, a short circuit.

BACKGROUND OF THE ART

Conventional fire detection systems in aircraft engines rely on fire detection switches disposed within electrical fire detection circuits. In isolation, such fire detection switches are circuit components connected to common and alarm pins connected to sources of electric current. Such conventional fire detection switches are normally open, so that current does not flow through them in ‘normal’, or operating, conditions, but is directed through a path having a resistor. When a fire detection switch is for example exposed to high temperatures associated with fire, the switch closes to complete the circuit and bypasses the path with a resistor. However, if a short circuit occurs through, for example, damage to the switch, a defect in the switch, or other circuit damage, the same bypassing of the path with a resistor can occur, and may result in a false alarm of fire. Conventional fire detection circuits are not capable of distinguishing between a true fire detection signal and a false signal caused by a short circuit.

SUMMARY

The disclosure herein provides fire detection circuits, and elements and devices for use in fire detection circuits, of engines, including particularly gas turbine or other aircraft engines. A fire detection circuit in accordance with the disclosure can, for example, include: first and second resistors disposed in series between a common terminal and an alarm terminal; and at least one thermally-sensitive element having a different resistance at low temperature than at high temperature, the at least one thermally-sensitive element disposed in series with the second resistor and in parallel with the first resistor.

In various aspects and embodiments, such fire detection devices comprise thermistors composed of electrically resistant materials having higher resistances at low temperatures than at high temperatures. In the same or other embodiments, such fire detection devices can comprise thermally-sensitive switches that change their state (open or closed) in response to temperature changes.

Also provided by the disclosure herein are gas turbine and other engines, including particularly aircraft engines, equipped with fire detection circuits comprising such thermally-sensitive elements.

DESCRIPTION OF THE DRAWINGS

In order that the disclosure may be readily understood, embodiments of circuits, devices, and elements in accordance with the disclosure are illustrated by way of example in the accompanying drawings.

FIG. 4 is a table which summarizes differences between the conventional circuit of FIG. 2 and the example embodiment of FIG. 3, with three possible actual physical conditions within the engine, the actual state of the fire detection switch circuit, and the electrical resistance to current passing through the fire detection switch including the associated resistors detected by the circuit.

Further details of the disclosure and advantages of the systems disclosed herein will be apparent from the detailed description included below.

DETAILED DESCRIPTION OF PREFERRED EMBODIMENTS

Figure 1:
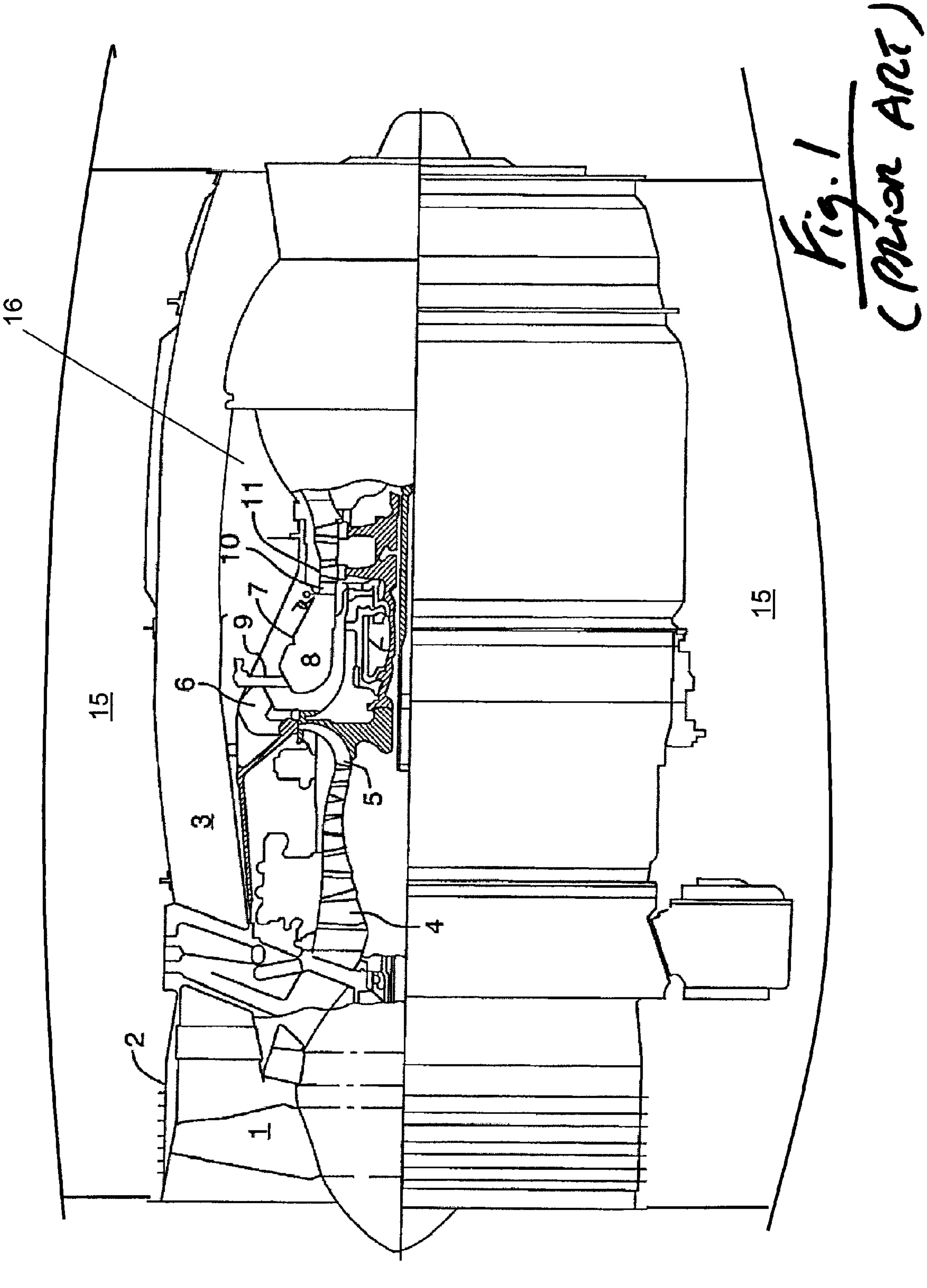
Fig. 1 (PRIOR ART)
FIG. 1 is a partial cross-sectional view of a prior art gas turbine engine showing the main components within the engine and example locations in which fire detection switches may be mounted.

FIG. 1 shows a partial cross-section through a gas turbine engine. It will be understood however that systems and methods according to the disclosure are equally applicable to any types of engines having, for example, combustors and/or turbine sections such as a turbo-shaft, a turbo-prop, turbojet, or auxiliary power units, or otherwise susceptible to fire, and particularly those used in aircraft or other aerospace applications. In the embodiment shown in FIG. 1, air intake into the engine passes over fan blades 1 in a fan case 2 and is then split into an outer annular flow through the bypass duct 3 and an inner flow through the low-pressure axial compressor 4 and high-pressure centrifugal compressor 5. Compressed air exits the compressor 5 through a diffuser 6 and is contained within a plenum 7 that surrounds the combustor 8. Fuel is supplied to the combustor 8 through fuel tubes 9 which is mixed with air from the plenum 7 when sprayed through nozzles into the combustor 8 as a fuel air mixture that is ignited. A portion of the compressed air within the plenum 7 is admitted into the combustor 8 through orifices in the side walls to create a cooling air curtain along the combustor walls or is used for cooling to eventually mix with the hot gases from the combustor and pass over the nozzle guide vane 10 and turbines 11 before exiting the tail of the engine as exhaust.

Combustible materials found in typical gas turbine engines include fuel, lubricating oil, plastic or rubber seals, and insulation covering electrical wires, for example which are found in many diverse locations throughout the engine.

Fire sensors are usually purchased from specialty manufacturers and may be used to detect fires based heat or temperature conditions, chemical concentrations, particles, or optical changes, and may be installed in any location(s) within the engine that are susceptible to or otherwise suitable for detection of fires. For example, fire detection switches may be mounted in the space 15 between the outside of the engine and the surrounding nacelle, as well as in a space 16 around the fuel manifold outward of the combustor 8 and between the bypass duct 3 and plenum 7.

As will be understood by those skilled in the relevant arts, once they have been made familiar with this disclosure, suitable location(s) for installation of fire detection circuits in accordance with this disclosure will depend upon the configuration of a particular engine, including the location of combustible fluids and other materials in the engine, the manner in which the engine is installed, and materials used in the components of the fire detection system. In the present description, the exact nature of the fire sensor is not relevant, so long as it exhibits resistive qualities which vary with temperature (including, for example, thermistor qualities or the opening and/or closing of a switch).

Fire detection systems can detect faults using resistors in differing circuits to provide a measurable difference in voltage and/or current across the fire detection switch to indicate a fault. Many devices use comparators and logic circuits to detect such voltage differences and provide signals indicating a fault associated with a fire situation. The present description and FIGS. 2-3 do not describe how differing voltage, current or resistance levels are detected and displayed, since such information is well known to those skilled in the relevant arts and does not form part of the claimed invention.

Figure 2:
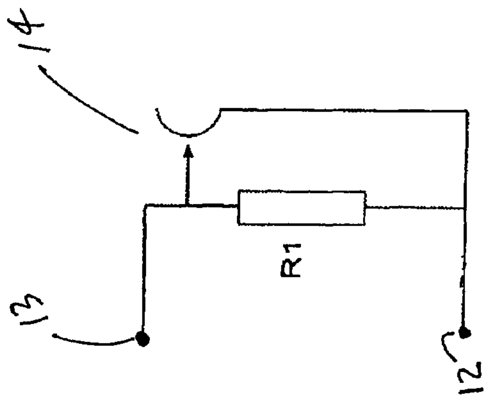
Fig. 2 (PRIOR ART)
FIG. 2 is a schematic electric circuit diagram showing an electric circuit of a conventional (prior art) fire detection switch including an associated resistor.

FIG. 2 shows a prior art fire detection switch in which current flows from common terminal 12 to alarm terminal 13 through the switch when disposed within a fire detection circuit (not shown). Alarm switch 14 is normally open, as shown, and closes (not shown) when exposed to a fire condition, such as excessive heat.

As summarized in FIG. 4, during Normal operation the prior art fire switch 14 of FIG. 2 is Open and resistance to current passing from common terminal 12 to alarm terminal 13 is the resistance of resistor R1. During an actual Fire condition, the normally Open fire switch 14, which has a relatively low resistance in comparison to resistor R1, is Closed, and current is substantially diverted through the fire switch 14 and bypasses resistor R1. Of course, since resistor R1 and the closed fire switch 14 are disposed in a parallel circuit, depending on the relative value of resistance for R1, some minimal current may pass through the resistor R1, and in reality current passing through the closed fire switch 14 will encounter some nominal resistance also. Since the resistance of resistor R1 is generally considerably (and perhaps orders of magnitude) greater than the resistance through the closed fire switch 14, significant current is diverted through the closed fire switch 14.

A disadvantage of the prior art fire detection circuit is revealed when, for example, a Short Circuit condition exists which includes any damage that results in the fire detection circuit being bypassed. Schematically, for example, a Short Circuit condition could be represented by inserting a conductor (not shown) directly between the common terminal 12 and the alarm terminal 13. Since resistor R1 offers resistance to current flow, most current would bypass the fire detection switch and flow directly through the path of least resistance, i.e. directly between the common terminal 12 and the alarm terminal 13.

As noted above, in the prior art fire detection switch of FIG. 2, there are no means of distinguishing between a Fire condition and a Short Circuit condition, since in both cases resistance between the common terminal 12 and the alarm terminal 13 is very low or zero for most practical purposes.

Figure 3:
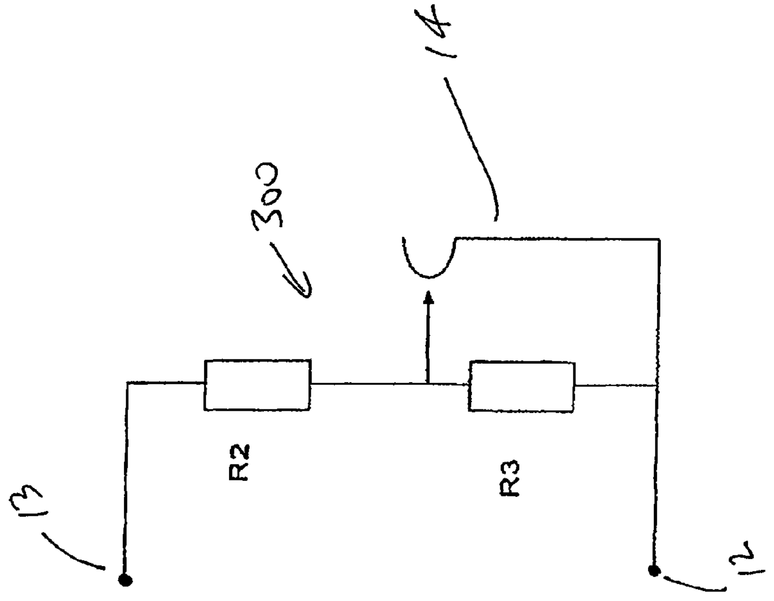
FIG. 3 is a schematic electric circuit diagram showing an embodiment of a portion of a fire detection circuit in accordance with the disclosure herein.

FIG. 3 shows a fire detection device 300 in accordance with the disclosure, in which current flows from common terminal 12 to alarm terminal 13 through the fire detection device when disposed within a fire detection circuit (not shown). Device 300 comprises first and second resistors R3 and R2, respectively, which are connected in series between terminals 12 and 13. Thermally-sensitive element 14, which exhibits different resistive qualities at low (e.g., engine operating) temperatures and at higher temperatures associated with fire conditions, is disposed in parallel with first resistor R3 and in series with second resistor R2.

Thermally-sensitive element 14 can comprise any one or more devices which exhibit significantly different electrically resistant qualities at low (e.g., engine operating) and high (e.g., fire-related) temperatures. Such devices can, for example, include thermistors and/or temperature-sensitive switches. As will be appreciated by those skilled in the relevant arts, a wide variety of each of these types of thermally-sensitive elements is now known, and doubtless others will hereafter be developed.

Thermistors suitable for use in implementing circuits in accordance with the disclosure include, for example, various types of conductors, including negative temperature coefficient (NTC) semiconductors, which exhibit variation in resistance in response to temperature changes. NTC thermistors may be manufactured, for example, through the use of oxides of iron, nickel, manganese, molybdenum, cobalt, etc. Thermistor elements suitable for use in implementing circuits according to the disclosure are provided by several manufacturers, including Kidde and Meggitt.

Similarly, a wide variety of temperature-sensitive switches are known, many of which are commercially available if forms suitable for implementing systems according to this disclosure.

Referring again to FIG. 3, it will be seen that a fire detection device 300 of FIG. 3 will exhibit different resistant qualities, which will be reflected in different current flows, at different temperatures, depending upon the precise nature of the thermally-sensitive element(s) employed at 14. A summary of possible states is provided in FIG. 4.

In FIG. 4 two broad types of fire detection detection device 300 are shown. A "normally open fire switch"-type device 14, as that term is used in FIG. 4, can include one or more temperature-sensitive switches which are open at relatively low (e.g., operating) temperatures and closed at relatively high (e.g., fire condition) temperatures, and/or or one or more thermally-sensitive materials which have high electrical resistance at low temperatures and low resistance at high temperatures. A "normally closed fire switch"-type device 14, as that term is used in FIG. 4, can include one or more temperature-sensitive switches which are closed at relatively low (e.g., operating) temperatures and open at high (e.g., fire) temperatures, and/or or one or more thermally-sensitive materials which have low electrical resistance at such low temperatures and high resistance at high temperatures.

A shown in FIG. 4, and as may be confirmed by reference to FIG. 3, for a "normally open fire switch"-type device 14, as that term is used in FIG. 4, at normal operating temperatures the total effective resistance of device 300 is the value of R2 plus the value of R2. In a fire condition, when thermally-sensitive element is in a low (or no) resistance state, the effective resistance of device 300 is R2 only; R3 is effectively bypassed. In a short circuit condition, i.e., when terminals 12 and 13 are shorted with respect to each other, device 300 provides minimal or no effective resistance.

As further shown in FIG. 4, and as may be confirmed by reference to FIG. 3, for a "normally closed fire switch"-type device 14, as that term is used in FIG. 4, at normal operating temperatures the total effective resistance of device 300 is the value of R2 only, as R3 is effectively bypassed. In a fire condition, when thermally-sensitive element is in a high resistance state, the effective resistance of device 300 is R2 plus R3. In a short circuit condition, i.e., when terminals 12 and 13 are shorted with respect to each other, device 300 provides minimal or no effective resistance.

Thus a circuit designer is offered a choice of operating and fire-condition circuit preferences. The application describes fire detection devices, in three different physical situations or conditions, as shown in FIG. 4, results is three different resistance readings. When systems and methods according to the disclosure are used, for example a true fire detection event can be distinguished from a false short circuit event. All three conditions have three different resistance measurements that can be detected. A real fire can be distinguished from a short circuit wiring fault, for example by measuring voltage and/or current through the fire detection switch and/or the associated fire detection circuit, which will indicate different resistance measurements for each of the three different physical situations or conditions.

Although the above description relates to a specific preferred embodiment as presently contemplated by the inventor, it will be understood that the invention in its broad aspect includes mechanical and functional equivalents of the elements described herein.

We claim:

1. A fire detection device for use in a fire detection circuit of a gas turbine engine, the fire detection device comprising:

a first resistor and a second resistor disposed in series between a common terminal and an alarm terminal; and at least one thermally-sensitive element having a different resistance at low temperature than at high temperature, the at least one thermally-sensitive element disposed in series with the second resistor and in parallel with the first resistor, the at least one thermally-sensitive element being configured to cause current to effectively bypass the first resistor depending on a temperature to which the thermally-sensitive element is exposed.

2. The fire detection device of claim 1, wherein the at least one thermally-sensitive element comprises a thermistor having a higher resistance at low temperature than at high temperature.

3. The fire detection device of claim 1, wherein the at least one thermally-sensitive element comprises a temperature-sensitive switch which is normally open at low temperature, and normally closed at high temperature.

4. The fire detection device of claim 1, wherein the at least one thermally-sensitive element comprises a temperature-sensitive switch which is normally closed at low temperature, and normally open at high temperature.

5. An aircraft engine comprising at least one fire detection circuit, the at least one fire detection circuit comprising:

a first resistor and a second resistor disposed in series between a common terminal and an alarm terminal; and at least one thermally-sensitive element having a different resistance at low temperature than at high temperature, the at least one thermally-sensitive element disposed in series with the second resistor and in parallel with the first resistor, the at least one thermally-sensitive element being configured to cause current to effectively bypass the first resistor depending on a temperature to which the thermally-sensitive element is exposed.

6. The engine of claim 5, wherein the at least one thermally-sensitive element comprises a thermistor having a higher resistance at low temperature than at high temperature.

7. The engine of claim 5, wherein the at least one thermally-sensitive element comprises a temperature-sensitive switch which is normally open at low temperature, and normally closed at high temperature.

8. The engine of claim 5, wherein the at least one thermally-sensitive element comprises a temperature-sensitive switch which is normally closed at low temperature, and normally open at high temperature.

9. The engine of claim 5, wherein the at least one thermally-sensitive element of the at least one fire detection circuit is located in a portion of the engine susceptible to fire.

* * * * *